(12) United States Patent
Cai et al.

(10) Patent No.: US 8,396,927 B2
(45) Date of Patent: Mar. 12, 2013

(54) DETECTION OF UNWANTED MESSAGES (SPAM)

(75) Inventors: Yigang Cai, Naperville, IL (US); Shehryar S. Qutub, Hoffman Estates, IL (US); Alok Sharma, Lisle, IL (US)

(73) Assignee: Alcatel Lucent, Paris (FR)

( * ) Notice: Subject to any disclaimer, the term of this patent is extended or adjusted under 35 U.S.C. 154(b) by 2541 days.

(21) Appl. No.: 11/018,269

(22) Filed: Dec. 21, 2004

(65) Prior Publication Data

US 2006/0168031 A1    Jul. 27, 2006

(51) Int. Cl.
    *G06F 15/16*      (2006.01)

(52) U.S. Cl. ......... 709/206; 709/207; 709/201; 709/202

(58) Field of Classification Search .................. 709/206, 709/207, 201, 202
See application file for complete search history.

(56) References Cited

U.S. PATENT DOCUMENTS

| 7,016,939 | B1 * | 3/2006 | Rothwell et al. | 709/206 |
|---|---|---|---|---|
| 7,171,450 | B2 * | 1/2007 | Wallace et al. | 709/206 |
| 7,219,131 | B2 * | 5/2007 | Banister et al. | 709/206 |
| 7,219,148 | B2 * | 5/2007 | Rounthwaite et al. | 709/224 |
| 7,249,162 | B2 * | 7/2007 | Rounthwaite et al. | 709/206 |
| 2004/0210640 | A1 | 10/2004 | Chadwick et al. | |

FOREIGN PATENT DOCUMENTS

| EP | 0720333 A | 7/1996 |
|---|---|---|
| WO | WO 2004/061698 | 7/2004 |

OTHER PUBLICATIONS

U.S. Appl. No. 10/920,005, S.S. Qutub.

* cited by examiner

*Primary Examiner* — Kristie Shingles

(57) ABSTRACT

In a telecommunications network, method and apparatus for blocking unwanted messages (spam). Messages are first examined by a fast process which uses rules and data tables to determine whether a message can be passed or is potentially a spam message. If the message is potentially a spam message, the message content is analyzed by a deep process. Advantageously, most messages can be passed or blocked quickly and extensive data processing is required only for the few messages which cannot be categorized by the fast process.

8 Claims, 3 Drawing Sheets

DETECTION OF UNWANTED MESSAGES (SPAM)

RELATED APPLICATION(S)

This application is related to the applications of:

Yigang Cai, Shehryar S. Qutub, and Alok Sharma entitled "Storing Anti-Spam Black Lists";

Yigang Cai, Shehryar S. Qutub, and Alok Sharma entitled "Anti-Spam Server";

Yigang Cai, Shehryar S. Qutub, and Alok Sharma entitled "Unwanted Message (Spam) Detection Based On Message Content";

Yigang Cai, Shehryar S. Qutub, Gyan Shanker, and Alok Sharma entitled "Spam Checking For Internetwork Messages";

Yigang Cai, Shehryar S. Qutub, and Alok Sharma entitled "Spam White List"; and

Yigang Cai, Shehryar S. Qutub, and Alok Sharma entitled "Anti-Spam Service";

which applications are assigned to the assignee of the present application and are being filed on an even date herewith.

TECHNICAL FIELD

In a telecommunications network, this invention relates to a method and apparatus for analyzing messages to detect unwanted (spam) messages.

BACKGROUND OF THE INVENTION

With the advent of the Internet, it has become easy to send messages to a large number of destinations at little or no cost to the sender. The messages include the short messages of short message service. These messages include unsolicited and unwanted messages (spam) which are a nuisance to the receiver of the message who has to clear the message and determine whether it is of any importance. Further, they are a nuisance to the carrier of the telecommunications network used for transmitting the message, not only because they present a customer relations problem with respect to irate customers who are flooded with spam, but also because these messages, for which there is usually little or no revenue, use network resources. An illustration of the seriousness of this problem is given by the following two statistics. In China in 2003, two trillion short message service (SMS) messages were sent over the Chinese telecommunications network; of these messages, an estimated three quarters were spam messages. The second statistics is that in the United States an estimated 85-90% of e-mail messages are spam.

A number of arrangements have been proposed and many implemented for cutting down on the number of delivered spam messages. Various arrangements have been proposed for analyzing messages prior to delivering them. According to one arrangement, if the calling party is not one of a preselected group specified by the called party, the message is blocked. Spam messages can also be intercepted by permitting a called party to specify that no messages destined for more than N destinations are to be delivered.

A called party can refuse to publicize his/her telephone number or e-mail address. In addition to the obvious disadvantages of not allowing callers to look up the telephone number or e-mail address of the called party, such arrangements are likely to be ineffective. An unlisted e-mail address can be detected by a sophisticated hacker from the IP network, for example, by monitoring message headers at a router. An unlisted called number simply invites the caller to send messages to all 10,000 telephone numbers of an office code; as mentioned above, this is very easy with present arrangements for sending messages to a plurality of destinations.

The actual process of detecting whether a particular message is a spam message is frequently quite complicated and can use substantial amounts of processing capability of the network. This can limit the throughput of the network.

SUMMARY OF THE INVENTION

Applicants have carefully analyzed the process of detecting spam messages. Inventively, they have recognized that for many spam messages the detection process is relatively straightforward whereas for others it is very complex. Since the complex analysis is frequently important for detecting new generators of spam messages, these complex situations cannot be simply ignored. Applicants have made a contribution over the prior art in accordance with their invention wherein the process of analyzing messages to determine whether they are spam is a two or more stage process wherein if a straightforward recognition of a message as being a spam or non-spam message is accomplished, subsequent processing is avoided. For the fast stage, the incoming messages are screened quickly, and cleared messages sent downstream, with minimum delay; detected spam messages are blocked, and a few suspicious (grey) messages are sent to the second stage for deep analysis. The first stage may not have a huge database to hold spam messages, but a small database to hold screening rules and criteria. The second stage or deep stage performs content based analysis and screening, and has a big database for storing both good and bad messages. The second stage contains a self training analysis engine with an information model to identify spam messages. The second stage delays the transmission of non-spam messages which it has analyzed. Advantageously, the bulk of messages can be rapidly analyzed and categorized as being spam or non-spam whereas the residue of the messages can be analyzed in depth.

BRIEF DESCRIPTION OF THE DRAWING(S)

DETAILED DESCRIPTION

Figure 1:
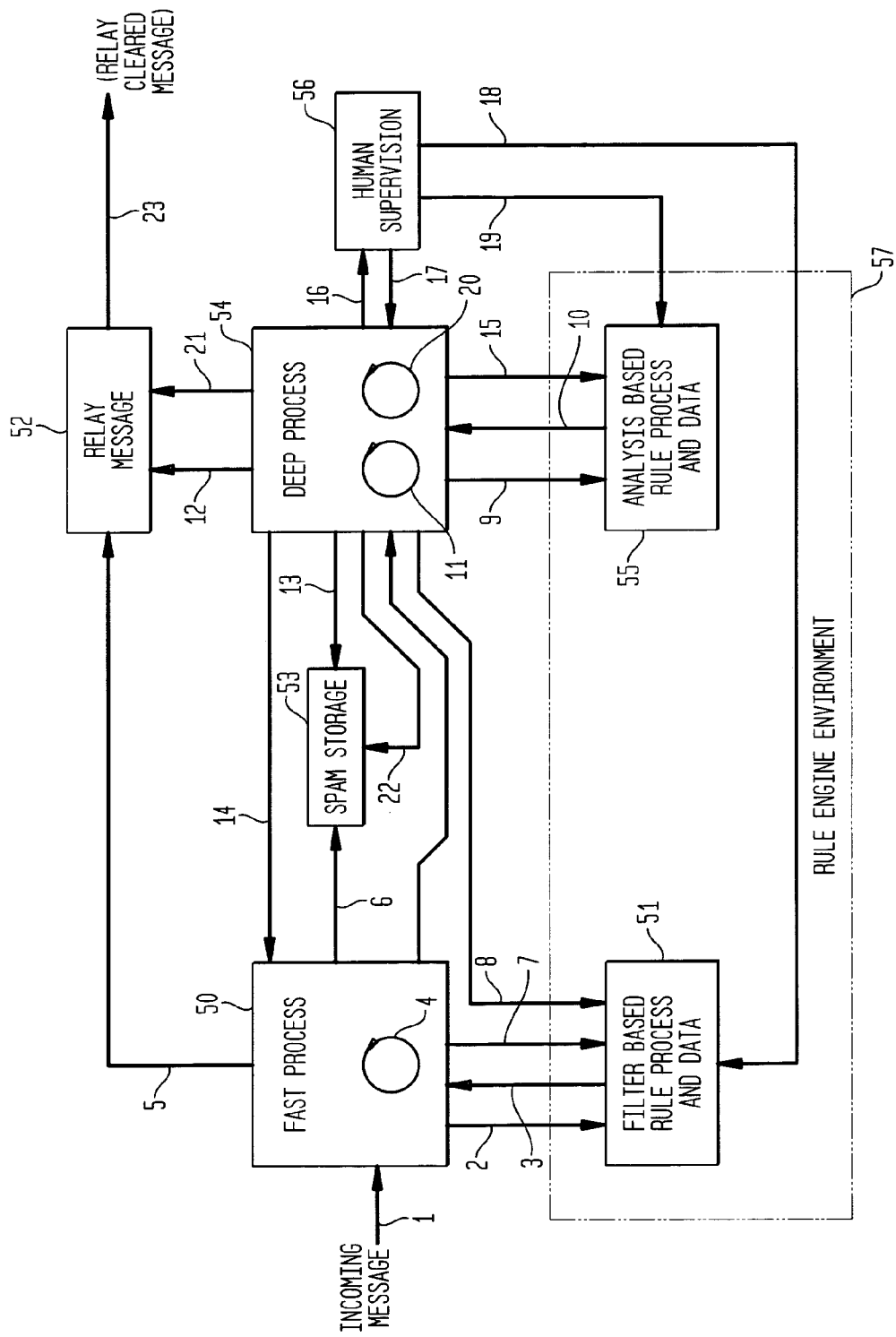
FIG. 1 is a state and state transition diagram illustrating the operation of Applicants' invention.

FIG. 1 is a state and state transition diagram illustrating the operation of Applicants' invention. This rule-based multi-step spam detection concept and architecture can be used broadly in applications of detecting spam for SMS or e-mail and also applied to wireless, wire-line, and Internet Protocol networks. Anti-spam application can be a standalone entity in the network to intercept incoming messages and filter spam messages. It can be also housed in an SMS center (SMSC), Internet protocol router, e-mail server, network gateways, or location servers. The anti-spam filter criteria and rules in the rule engine database can be provisioned, viewed, searched, and updated by the service provider or end user.

One anti-spam application can be implemented with a set of fast and deep process rule engines; just one fast rule engine; just one deep rule engine; multiple fast process rule engines; multiple fast process rule engines and one deep process rule engine. A network can have multiple anti-spam applications which include combinations of the fast and deep rule engines.

Rule engine databases can be centralized (shared with all rule engines in the network) or distributed (each rule engine having its own database) or can use a combination of centralized and distributed databases. For example, in a particular network all of the fast rule engines can be distributed and all the deep process rule engines share one centralized database; a human analyst can easily access the rule engine and database for spam recommendations and updating rules. In the system of FIG. 1, the application will extract header and content information and compare both of them to data in a database for spam checking of any incoming message (transition 1 into fast process system 50). The fast process then invokes a rule engine requesting analysis of the buffered messages (step 2 to process 51). Process 51 is a filter-based rule process and the data to support such a process. Process 51 carries out its function based on rules that operate on filter data such as black/white lists, sender/receiver addresses, network identities, number of similar messages received in a given time period, number of similar messages sent by one source in a given time period. A response from rule engine 51 is sent back to the fast process in step 3. Step 4 is an internal process, i.e., one without transition and is carried out in response to the message received in step 3. In step 4, the fast process assigns suspect levels to messages that are flagged by the rule engine 51. If a message is not flagged, the fast process forwards it to a network relay message element 52 in step 5 to be forwarded to the destination. The relay message element can be within or outside the anti-spam application.

If an aggregated suspect level assigned to a message crosses a predefined threshold, the fast process sends it to a spam database 53 for storage in anticipation of legal processing and for use by legal authorities. The fast process sends this message in step 6. In step 7, the fast process sends information for updating the number of new and remaining messages to be analyzed to the filter-based rule process 51.

If the fast process assigns an aggregate suspect level to a message that does not cross the predefined threshold, it will alert the deep analysis process 54 by sending it a pointer to the suspect message in step 8. The deep process 54 extracts the message from the buffer 53 along with correlated identification and sends a request to an analysis-based rule engine 55 to perform a further spam check (step 9). The rule engine which performs deep processing will run deep analysis, mostly based on message type and content, and send the result back to deep process 54 in step 10. The deep process 54 then determines whether this message is a spam message in an internal step 11. If the message is deemed to be clean, the deep process forwards it to the relay message element 52 (step 12). If the message is deemed to be spam, it sends the spam to a spam storage 53 in step 13.

The deep process sends a command with an update request to the fast process database, step 14, if it determines there is a need to update the fast process's filter data and/or the deep process sends a command with an update request to the analysis-based rule process and data function 55 if it is determined that there is a need to update the deep process filter data (step 15). If the deep process function cannot make a decision, the suspect message or associated index information (for privacy protection) is sent to a human analyst 56 for a recommendation to the deep process (step 16). The human analyst examines the message or index information and makes a recommendation to the deep process 54 (step 19). After receiving the human analyst's recommendations, the deep process further processes the spam check (step 20) internal in the deep process 54. If the message is cleared it is sent to the relay message element (step 21). If it is considered a spam message, it is sent to the storage database 53 (step 22). The relay message sends cleared messages to an interworking network element, thence to a final termination address (step 23) and returns an acknowledgment to the message originator node.

Note that even here there are several decision points at which it is possible to make further tests of a message to determine whether the message is spam. The initial test is test 4 but subsequent tests include test 11 and test 20. The human supervision after performing its analysis can send additional input for use by the databases of the filter-based rule process 51 and/or the analysis-based rule process 55.

Figure 2:
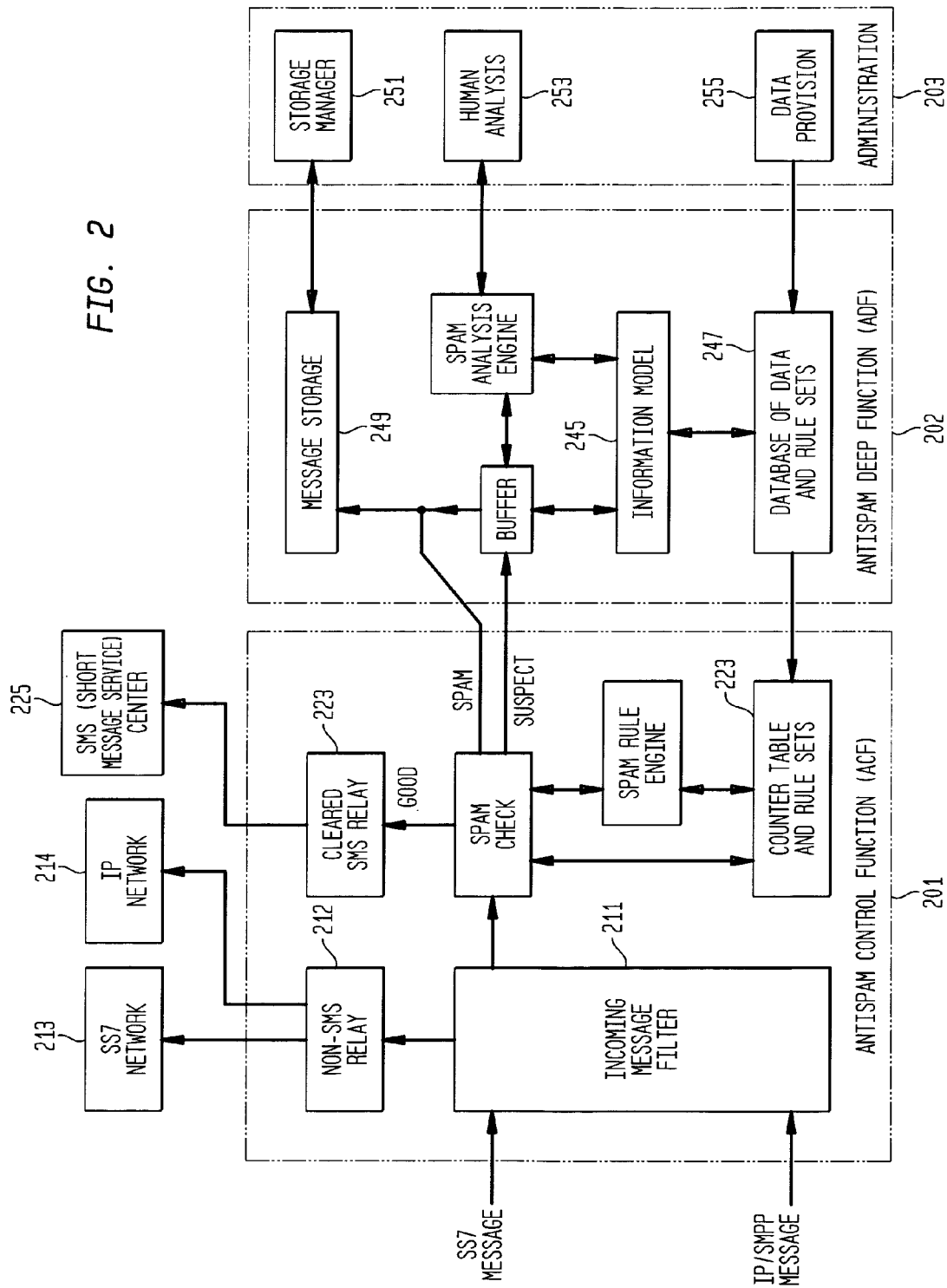
FIG. 2 is a diagram of the structure of the network level anti-spam application.

FIG. 2 is a more detailed flow diagram and block diagram illustrating the operation of Applicants' invention. FIG. 2 is aimed specifically at the short message service application. FIG. 2 has three primary blocks: an anti-spam control function 201, an anti-spam data function 202, and an anti-spam administrative function 203. As will be seen below, messages flow between these units. Incoming messages include messages of the Signaling System 7 network (including the public switched telephone network and the mobile telephone network) and Internet Protocol messages as well as short message peer to peer protocol messages. All of these messages come into an incoming message filter 211 which filters out the non-SMS messages and sends these messages to relay unit 212. The relay unit forwards messages for the SS7 network to that network 213 and Internet Protocol messages to IP network 214.

The remaining SMS messages are sent to spam check unit 221. This unit performs all the checks which can be performed very rapidly in order to ensure that the anti-spam data function unit 202, which performs the deep analysis, is not overloaded. Among the checks that are performed by spam rule engine 231 are checks for determining whether the source destination pair represents a pair for which messages are to be allowed, to be blocked, or are suspect. In addition, the spam rule engine 231 can also be used for filtering out cases of massive spam wherein one source sends the same message to hundreds or thousands of destinations. The spam check unit uses a spam rule engine 231 to filter possible spam messages against rules for detecting spam messages and data such as source destination, allow/block tables, stored in counter table and rule sets (block 233). The counter table and rule sets block is populated in part by newly discovered spam types identified by the administrative system and/or the anti-spam data function, the deep analysis unit. For example, either of these units may detect a sudden spurt of messages having a subject "lottery" to attempt to defraud recipients of the message through false lottery reports.

As indicated above, the primary criterion for the types of tests performed in the anti-spam control function unit is the speed with which these functions can be performed. Functions which require a large amount of analysis to determine whether a particular message is spam or allowable cannot be performed by the anti-spam control function because this unit is very traffic sensitive; such functions either must be performed by the anti-spam data function 202 or the message is arbitrarily blocked or passed. If a decision is made by the spam check unit 221 that a message may be transmitted, it is transmitted to the short message service relay 223 which passes the message on to a short message service center 225 from which the message may be transmitted to the destination.

If the spam check unit 221 decides that a message is suspect and should be subjected to further analysis by the anti-spam data function unit 202, the message is transmitted to buffer 241. If the message has been identified as a spam message it is also passed directly to message storage unit 249.

Suspect messages are passed to a spam analysis engine 243 where they are compared with information models 245. The information models access a database of data and rule sets 247 to determine if the received message is a spam message. If the spam analysis engine 243 determines that the message is not a spam message then the contents of buffer 241 which contain the message are transmitted back to the relay unit 223 from which the messages are sent to the short message service center 225 or an email server (not shown) for transmission to the destination. If the spam analysis engine determines that the message is a spurn message, it is sent to message storage 249 for possible analysis by the administrative unit 203. The message storage unit 249 communicates with a storage manager 251 of the administrative office to bring appropriate messages to the attention of an analyst in human analysis (block 253) and if the message is no longer worth retaining allows the message storage 249 to clear the message. The human analysts in human analysis (block 253) may detect situations in which a new class of spam messages has been found or an old class which had previously been ignored has suddenly re-emerged. In either case, the data provision (block 255) initializes further rule sets in data and rule sets database 247 and, where appropriate, also in the counter table and rule sets 233.

It is not the purpose of Applicants' invention to teach new spam detection rules. Rather it is the purpose of Applicants' invention to teach how spam detection rules can be implemented most effectively in order to accomplish the somewhat conflicting goals of blocking most spam messages, transmitting non-spam messages quickly, and detecting new spam situations quickly.

In order to meet Applicants' objective of making the anti-spam control function as fast as possible in order to minimize message delay, in Applicants' preferred embodiment the following functions are carried out in the anti-spam control function (the fast process):

Permit (white list) and block (black list) are checked against sender sources. Source/destination pairs can also be checked, but the checks of sources are the most productive. The sender source is verified against the network address information of the source. A check is made to see if the number of messages exceeds a limitation for that source. This includes updating counters of the number of messages from individual sources and comparing them against limits stored in the anti-spam function control. A check is made to detect message bursts indicating a spam pattern, for example, one in which a large number of messages are being sent to adjacent terminating parties. A brief check is made for specific key words or phrases indicating patterns such as adult content. Individual customers can provide specific spam rules tailored to their application. The anti-spam control function relays good messages to the destination, forwards spam messages to a spam database, and forwards suspect messages to the anti-spam data function.

The anti-spam data function buffers suspect messages and analyzes these messages to accumulate a score for each message. Scores above a certain threshold are treated as spam and scores below such a threshold are treated as good messages to be forwarded to the destination. In addition, uncertain suspect messages are forwarded to an administrative bureau for human analysis.

The anti-spam data function also has self-learning capabilities. A large amount of storage is available for storing spam messages. These messages can be analyzed for patterns in an attempt to refine rules. For example, if more than n spam messages, having a particular pattern in their text, occur within a period of h hours, a rule for detecting such messages can be automatically inserted in the rule database of the anti-spam data function. If more than p occurrences of the pattern are detected, the rule can be inserted in the anti-spam control function. Addition of such self-learned rules can be made subject to acceptance by an operator in the administrative function.

Figure 3:
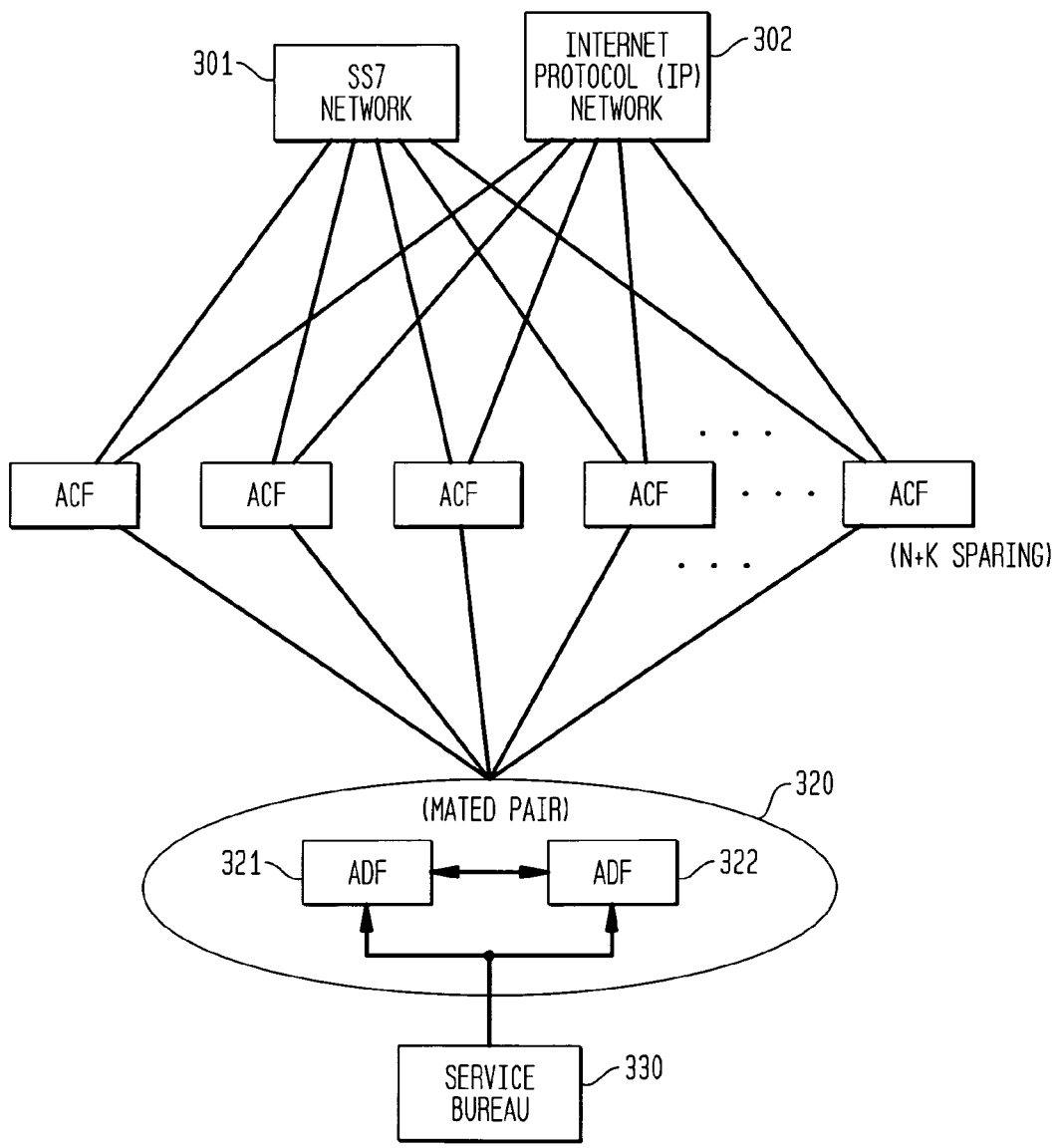
FIG. 3 is a diagram of the interconnections among fast process and deep process units.

FIG. 3 is a block diagram illustrating one preferred embodiment of Applicants' invention. A set of anti-spam control function units 310, 311, 312, 313, . . . , 314 receives messages from and transmits messages to both Internet Protocol networks 301 and SS7 networks 303. These units are connected by an Internet protocol connection to anti-spam data function units 320, arranged as a pair 321, 322 for reliability. The anti-spam data function units are connected to a service bureau 330 for further analysis by a human operator. The anti-spam control function units perform the rapid anti-spam checks and send non-SMS messages and cleared SMS messages back to signaling 7 or Internet Protocol networks to be forwarded to the message destinations. Enough anti-spam control function units are provided so that if up to K anti-spam control function units fail then the system can still operate. Reliability for the anti-spam data function is provided by simple duplication.

Spam content analysis by the anti-spam data function analyzes both good and spam messages in order to update analysis information models within the anti-spam data function, and to update rules and counters for use by the anti-spam control function. These updated rules and counters are distributed to the various anti-spam control functions. The system therefore becomes a self-training system, in addition to the changes in the rules and counters made by operators at the anti-spam data function.

The above description is of one preferred embodiment of Applicants' invention. Other embodiments will be apparent to those of ordinary skill in the art without departing from the scope of the invention. The invention is limited only by the attached claims.

We claim:

1. In a telecommunications network a method of detecting unwanted messages (spam) comprising the steps of:
    transmitting messages to a spam detection system;
    receiving a message in a fast process system of said spam detection system, said fast process system using rules and data tables to determine whether said message is spam or non-spam;
    if it is determined in said fast process system that said message is non-spam, sending said message toward a destination;
    if it is determined in said fast process system that said message may be spam, sending said message to a deep process for analyzing message content;
    based on analysis by said deep process of said message content, determining whether said message is spam; and
    if said message may be spam, blocking said message from being transmitted toward a destination.

2. The method of claim 1 wherein said deep process system further performs the steps of:
    detecting new patterns of spam messages; and
    responsive to said detecting, updating rules of said process.

3. The method of claim 1 further comprising the step of:
    if said deep process system cannot determine whether a message is spam, forwarding said message to a service bureau for analysis by a human operator.

4. The method of claim 3 further comprising the step of:
    said human operator modifying rules of said fast process.

5. In a telecommunications network, apparatus for detecting unwanted messages (spam) comprising:
- means for transmitting messages to a spam detection system;
- means for receiving a message in a fast process system of said spam detection system, said fast process system using rules and data tables to determine whether said message is spam or non-spam;
- means for determining in said fast process system that said message is non-spam, and for sending said message toward a destination;
- in said fast process system, means for determining that said message may be spam, and for sending said message to a deep process for analyzing message content;
- means for determining whether said message is spam based on analysis by said deep process of said message content; and
- means for blocking said message from being transmitted toward a destination if said message may be spam.

6. The apparatus of claim 5 wherein said deep process system further performs the functions of:
- detecting new patterns of spam messages; and
- responsive to said detecting, updating rules of said process.

7. The apparatus of claim 5 further comprising:
- means for forwarding said message to a service bureau for analysis by a human operator if said deep process system cannot determine whether a message is spam.

8. The apparatus of claim 7 further comprising:
- means for permitting said human operator to modify rules of said fast process.

* * * * *